United States Patent [19]
Pruitt et al.

[11] Patent Number: 4,952,154
[45] Date of Patent: Aug. 28, 1990

[54] DEMONSTRATOR DEVICE FOR TIRE ECCENTRICITIES

[76] Inventors: Carl W. Pruitt, Rte. 4, Box 124A, Conway, Ark. 72032-9410; Niall F. Davidson, 14701 Cecil Dr., Little Rock, Ark. 72212-1972

[21] Appl. No.: 407,484

[22] Filed: Sep. 14, 1989

[51] Int. Cl.$^5$ .................................. G09B 250/000
[52] U.S. Cl. ................................. 434/376; 434/365
[58] Field of Search ............... 434/365, 366, 367, 373, 434/374, 376, 402, 404, 300; 73/146

[56] References Cited

U.S. PATENT DOCUMENTS

| | | | |
|---|---|---|---|
| 2,492,066 | 12/1949 | Schildmeier | 434/376 |
| 2,950,565 | 8/1960 | Bridges | 446/266 |
| 3,716,297 | 2/1973 | Carter | 434/376 |
| 3,901,503 | 8/1975 | Klose | 272/128 X |
| 3,987,557 | 10/1976 | Valentine | 434/376 X |
| 4,078,339 | 3/1978 | Ongaro | 73/146 X |
| 4,674,987 | 6/1987 | Sober | 272/128 X |
| 4,817,429 | 4/1989 | Goebel | 73/462 X |

OTHER PUBLICATIONS

Welch College Physics Apparatus; "Maxwell's Top"; 1965; p. 41.

Primary Examiner—Richard J. Apley
Assistant Examiner—Rachel M. Healey
Attorney, Agent, or Firm—Ronald C. Kamp; R. B. Megley

[57] ABSTRACT

Devices for demonstrating the effect that eccentricities in a tire and rim can have when the combination is rotated having a circular member representing a rim mounted for rotation about a center different from its geometric center and an annular member representing a tire with a varying radial dimension is positioned and retained at a plurality of angular positions on the circle member. An indicator operatively associated with the annular member represents the resulting eccentricity of both members. A similar hand-held device represents that combined eccentricity by conveying vibrations through a handle to the operator's hand.

5 Claims, 1 Drawing Sheet

U.S. Patent
Aug. 28, 1990
4,952,154
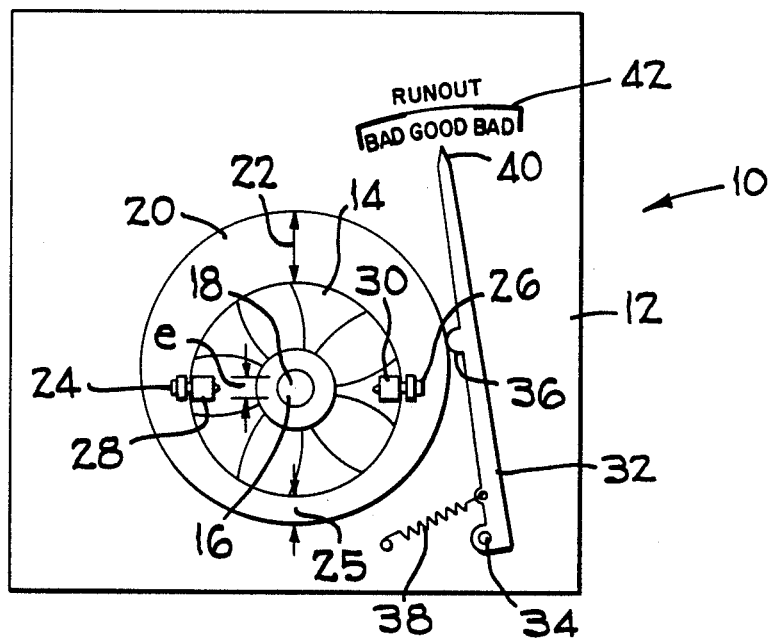
FIG_1
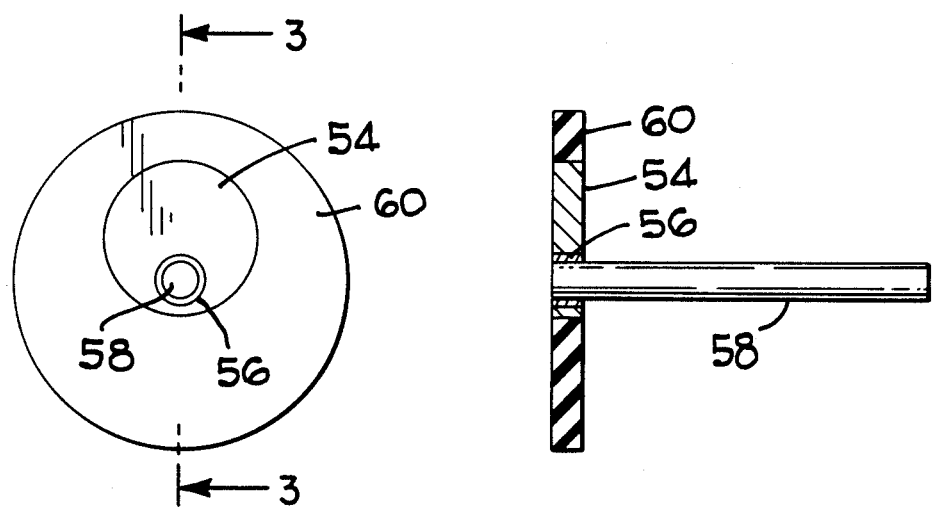
FIG_2    FIG_3

DEMONSTRATOR DEVICE FOR TIRE ECCENTRICITIES

SUMMARY OF THE INVENTION

This invention relates to demonstration devices generally, and more particularly, to such devices for demonstrating the effect eccentricities in both a tire and rim can have when the combination is rotated.

All automotive vehicles are subject to vibration induced by imbalance in and runout of the tires and rims on which they are supported. Some vehicles are more sensitive than others to such vibration, which is a function of the vehicle's structural stiffness, the spring and unsprung weights, the stiffness of the tires, the springs and the shock absorbers. Consequently, larger and heavier vehicles are more tolerant of imbalance and runout, while convertibles are often more sensitive due to their relatively lower structural stiffness. Regardless of vehicle size or type, looseness or wear in the vehicle's suspension and steering components and worn shock absorbers permit accentuation of such vibrations.

Imbalance and runout in the wheel and rim as a unit create the forces which induce the aforementioned vibrations on a vehicle. The imbalance forces increase significantly with increases in the vehicle's speed, with the effects being noticeable at speeds of 40 mph and higher. Runout forces do not increase significantly with speed and may be evident at low speeds or for a certain band of speeds, i.e., vibrations may begin to be felt at 55 mph and may disappear at 65 mph, for example. Runout can be reduced by using the error or eccentricity existent in the tire to offset the error or eccentricity existent in the rim. However, if one of these components is perfect, there can be no offset of one component's error against another's When error in both exist, runout can be reduced or eliminated by match-mounting the tire on the rim, i.e., angularly orienting the tire so that its eccentricity offsets or cancels the error or eccentricity in the rim.

While the concept of imbalance, i.e., a non-uniform angular distribution of weight, is well understood, the concept of runout is not widely comprehended. Placing weight on a rim to achieve a balanced tire and rim combination will reduce or eliminate the vibrations induced by imbalance but will not reduce the vibrations induced by runout. Only match-mounting the tire and rim will achieve reduction in runout induced vibrations.

The present invention provides a means that demonstrates the effect of runout, that illustrates the benefits of match-mounting a tire on a rim and does so with visual and/or other sensor output, and that is relatively simple to operate and comprehend. These and other attributes of the present invention, and many of the attendant advantages thereof, will become more readily apparent from a perusal of the accompanying drawings, wherein:

BRIEF DESCRIPTION OF DRAWINGS

FIG. 1 is a front elevational view of one embodiment of the invention;

FIG. 2 is a front elevational view of a second embodiment of the invention; and

FIG. 3 is a cross-sectional view taken on line 3—3 of FIG. 2.

DESCRIPTION OF THE PREFERRED EMBODIMENTS

Referring now to FIG. 1, there is shown a match-mount demonstration device, indicated generally at 10, which is suitable for display and use at a trade show, for example. A support panel 12 is retained in an essentially vertical position by any suitable means. A circular member 14 having its geometric center at 16 is painted or otherwise decorated to give the appearance of a wheel or rim. The member 14 is supported on the panel 12 and rotatable about the point 18, which is offset from the geometric center 16 by a distance e representing the eccentricity or error in a wheel. An annular member 20, which is painted or otherwise decorated to give the appearance of a tire, has an inner diameter which is just slightly greater than the outer diameter of the circular member 14 so that the angular relationship between members 14 and 20 may be changed. The annular member 20 has a radial dimension, i.e., a radial thickness, which varies uniformly from a maximum, as indicated at 22, to a minimum, as indicated at 25. A pair of retractable pins 24 and 26 are mounted on the annular member 20. The pins 24 and 26 are engageable with receptacles 28 and 30 carried by the circular member 14. The pins 24 and 26 and the receptacles 28 and 30 are mounted on their respective members so that the pin 24 may engage receptacle 30 and pin 26 may engage receptacle 28. When the annular member 20 is oriented relative to the circular member 14 as shown in FIG. 1, the eccentricity or error of the circular member 14 is offset by the eccentricity or error of the annular member 20 and runout is reduced. By retracting the pins 24 and 26, and orienting the annular member so that pins 24 and 26 may engage receptacles 30 and 28 respectively, the eccentricity or error of the circular and annular members is additive and runout is greatest.

A lever 32 is pivotally mounted on the panel 12 by pin 34 and has a cam surface 36 formed thereon to engage the outer surface of annular member 20. A tension spring 38 is connected between the lever 32 and the panel 12 and urges the cam surface 36 into engagement with the member 20. An indicator 40 is formed on the end of the lever 32 and points to indicia 42 provided on the panel 12 at the end of the indicator. The amount of runout will thus be indicated by the indicator 40 when the annular member 20 is rotated when latched to the circular member 14; the unit rotating about the point 18. The amplitude of the movement of the indicator 40 will thus provide visual evidence of the benefit of match-mounting of a tire on a rim.

The embodiment of the invention shown in FIGS. 2 and 3 is a hand-held unit. A circular member 54 is mounted on a bearing or bushing 56 carried by a handle 58 which may be grasped by and held in the hand of a user. An annular member 60 is formed of a stretchable material such as rubber, for example, and may be removably mounted on the circular member 54. As can be readily seen from the drawing, the geometric center of the circular member 54 is offset from the axis of rotation determined by the bushing 56 and the center of the annular member as is the annular member 60. When the annular member 60 is pressed onto the circular member 54 as shown in FIGS. 2 and 3, the unit, when spun by hand will have virtually no runout. However, when the annular member 60 is pressed onto the circular member 54 at a position 180° from that shown, runout will be at a maximum. Not only will the runout be visual evident when the unit is spun, but the user will feel vibration in the hand holding the handle 58. Of course, this vibration is caused by the imbalance of the unit, no off-setting balancing weights having been added, but will create the impression to the user that runout can cause vibration.

While two embodiments of the present invention have been illustrated and described herein, various changes may be made therein without departing from the spirit of the invention as defined by the scope of the appended claims.

What is claimed is:

1. A device for demonstrating the benefits of match-mounting a tire on a rim comprising:
   a generally circular member representative of a rim having a geometric center;
   means supporting said circular member for rotation about a center different from said geometric center;
   an annular member representative of a tire
   of being positioned and retained on said circular member at a plurality of angular positions relative thereto; capable said annular member having a varying radial dimension representative of tire eccentricity; and indicator means operatively associated with said annular member for indicating tire runout.

2. The invention according to claim 1, and further comprising:
   an essentially vertical panel for supporting said circular member; and
   a lever pivotally mounted on said panel and biased against said annular member to visually indicate the runout.

3. The invention according to claim 2 wherein latch means are provided to permit the annular member to be retained at a plurality of angular positions on said circular member.

4. A device for demonstrating the effects of runout in a tire mounted on a rim comprising: a handle capable of being grasped by a human
   a circular member rotatably mounted on said handle with the center of rotation being offset from the geometric center thereof;
   an annular member removably positionable on said circular member; and
   said annular member having a radial dimension uniformly varying from a maximum thickness to a minimum thickness diametrically opposed to said maximum thickness representing the effects of tire runout.

5. The invention according to claim 4 wherein said annular member is made of a stretchable material to permit positioning of said annular member at any one of a plurality of positions relative to circular member.

* * * * *

UNITED STATES PATENT AND TRADEMARK OFFICE
CERTIFICATE OF CORRECTION

PATENT NO. : 4,952,154

DATED : AUGUST 28, 1990

INVENTOR(S) : CARL W. PRUITT ET AL

It is certified that error appears in the above-identified patent and that said Letters Patent is hereby corrected as shown below:

Column 3, line 21: following the word "tire" add the word --capable--;

line 25: delete the word "capable";

line 25: start a new paragraph commencing with the word "said";

line 27: start a new paragraph commencing with the word "indicator".

Column 4, line 13: start a new paragraph commencing with the words "a handle";

line 14: after the word "human" insert --hand;--;

Signed and Sealed this

Twenty-first Day of July, 1992

Attest:

DOUGLAS B. COMER

*Attesting Officer*    *Acting Commissioner of Patents and Trademarks*